(12) United States Patent
Potter

(10) Patent No.: US 7,853,453 B2
(45) Date of Patent: *Dec. 14, 2010

(54) ANALYZING DIALOG BETWEEN A USER AND AN INTERACTIVE APPLICATION

(75) Inventor: Stephen F. Potter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

This patent is subject to a terminal disclaimer.

(21) Appl. No.: 11/170,860

(22) Filed: Jun. 30, 2005

(65) Prior Publication Data

US 2007/0005369 A1 Jan. 4, 2007

(51) Int. Cl.
*G10L 21/00* (2006.01)
(52) U.S. Cl. ................................. 704/270.1
(58) Field of Classification Search .............. 704/270.1, 704/275
See application file for complete search history.

(56) References Cited

U.S. PATENT DOCUMENTS

| | | | | |
|---|---|---|---|---|
| 5,588,044 A | * | 12/1996 | Lofgren et al. ............. | 379/67.1 |
| 5,678,002 A | * | 10/1997 | Fawcett et al. ............. | 715/709 |
| 5,787,414 A | | 7/1998 | Miike et al. | |
| 5,960,394 A | * | 9/1999 | Gould et al. ............. | 704/270.1 |
| 5,983,179 A | * | 11/1999 | Gould ..................... | 704/270.1 |
| 5,999,904 A | * | 12/1999 | Brown et al. ................ | 704/272 |
| 6,014,647 A | | 1/2000 | Nizzari et al. | |
| 6,405,170 B1 | * | 6/2002 | Phillips et al. .............. | 704/270 |
| 6,510,411 B1 | * | 1/2003 | Norton et al. ................ | 704/254 |
| 6,526,382 B1 | * | 2/2003 | Yuschik ...................... | 704/275 |
| 6,606,598 B1 | * | 8/2003 | Holthouse et al. ........... | 704/275 |
| 6,823,054 B1 | | 11/2004 | Suhm et al. | |
| 6,829,603 B1 | | 12/2004 | Chai et al. | |
| 6,839,669 B1 | * | 1/2005 | Gould et al. ................ | 704/246 |
| 6,904,143 B1 | | 6/2005 | Peterson et al. | |
| 7,003,079 B1 | | 2/2006 | McCarthy et al. | |
| 7,020,841 B2 | | 3/2006 | Dantzig | |
| 7,043,435 B2 | | 5/2006 | Knott et al. | |
| 7,085,716 B1 | * | 8/2006 | Even et al. ................... | 704/235 |
| 7,216,079 B1 | * | 5/2007 | Barnard et al. .............. | 704/244 |
| 7,302,390 B2 | * | 11/2007 | Yang et al. .................. | 704/246 |
| 7,383,170 B2 | | 6/2008 | Mills et al. | |
| 7,593,854 B2 | | 9/2009 | Belrose | |
| 2004/0162724 A1 | | 8/2004 | Hill et al. | |
| 2007/0005354 A1 | | 1/2007 | Potter | |
| 2007/0006082 A1 | | 1/2007 | Potter | |

FOREIGN PATENT DOCUMENTS

EP 1286330 2/2003

OTHER PUBLICATIONS

Written Opinion of the US Patent Office in counterpart foreign application No. PCT/US06/22134 filed Jun. 7, 2006.
Search Report of the US Patent Office in counterpart foreign application No. PCT/US06/22134 filed Jun. 7, 2006.
User's Guide, SpeechWorks for OpenSpeech Insight™ Analysis and Reporting Tool 1.0, Mar. 2002, pp. 1-324.

* cited by examiner

*Primary Examiner*—Michael N Opsasnick
(74) *Attorney, Agent, or Firm*—Steven M. Koehler; Westman, Champlin & Kelly, P.A.

(57) ABSTRACT

A computer implemented method of analyzing dialog between a user and an interactive application having dialog turns. The method includes receiving information indicative of dialog turns between the system and at least one user in an application. The turns are related to one or more tasks of the application. A diagnostic module operable on a computer is utilized to obtain an indication of performance of the application relative to said one or more tasks.

20 Claims, 12 Drawing Sheets

ANALYZING DIALOG BETWEEN A USER AND AN INTERACTIVE APPLICATION

BACKGROUND

The discussion below is merely provided for general background information and is not intended to be used as an aid in determining the scope of the claimed subject matter.

Small computing devices such as personal digital assistants (PDA), devices and portable phones are used with ever increasing frequency by people in their day-to-day activities. With the increase in processing power now available for microprocessors used to run these devices, the functionality of these devices is increasing, and in some cases, merging. For instance, many portable phones now can be used to access and browse the Internet as well as can be used to store personal information such as addresses, phone numbers and the like.

In view that these computing devices are being used with increasing frequency, it is therefore necessary to provide an easy interface for the user to enter information into the computing device. Unfortunately, due to the desire to keep these devices as small as possible in order that they are easily carried, conventional keyboards having all the letters of the alphabet as isolated buttons are usually not possible due to the limited surface area available on the housings of the computing devices. Even beyond the example of small computing devices, there is interest in providing a more convenient interface for all types of computing devices.

To address this problem, there has been increased interest and adoption of using voice or speech to access information, whether locally on the computing device, over a local network, or over a wide area network such as the Internet. With speech recognition, a dialog interaction is generally conducted between the user and the computing device. The user receives information typically audibly and/or visually, while responding audibly to prompts or issuing commands. However, it is often desirable to ascertain the performance of the application during development or after it has been deployed. In particular, it is desired to ascertain usage and/or success rates of users with the application from logged data. With such information, the developer may be able to "tune" (i.e. make adjustments) to the application in order to better meet the needs of the users of the applications. For example, it may be helpful to identify portions of the dialog between the application and the users where problems are most likely to be encountered. In this manner, those portions of the dialog can be adjusted to alleviate confusion.

Nevertheless, determining dialog problems from the log data of deployed applications (e.g. speech and DTMF) is difficult. Dialog problems are essentially user experience problems with the flow of the interaction. They typically result in user frustration, followed by a hang-up or request for operator assistance. In addition, dialog problems are costly to the entity deploying the application in terms of customer ill-will and as well as support expenses.

While the symptoms of dialog problems are fairly clear (low task completion rates and increases in hang-ups or other cancellations), the causes of such problems can be extremely hard to find. Typical dialog problems tend to be a result of mismatches between system and user understanding of the task at hand. They commonly arise from lower level application problems such as prompts that are confusing, or paths that are mistakenly taken (by system error or user misunderstanding).

A large volume of session data is typically required to conduct a diagnosis, yet the large volume of session data means that manual analysis of such data is a long and tedious process. For instance, lengthy stretches of dialog are generally required in order for the full picture of confusion to surface, which must be generalized across users. Furthermore, pinpointing the source location of the problem (the dialog state where the confusion begins) is difficult: for any given hang-up or other user cancellation, because the source of the problem may be several turns prior to the cancellation. In addition, speech applications tend to differ so broadly in their user interaction model that implementations of automated analysis are generally application-specific and limited in extensibility. Lastly, for speech recognition applications, the imperfection of speech recognizers means that a true analysis of user behavior must generally be founded on manual transcriptions of the user input—a secondary and typically costly process.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

Dialog analysis of user/system interaction, such as but not limited to speech, DTMF (dual tone modulated frequency), etc., provides an automated technique of identifying likely dialog problems that is general to a wide variety of applications, and can remove the need for the transcription of responses/utterances. Analytical processes are applied to log data and use dialog move information such as dialog turn (user-system exchange) information such as but not limited to the type of turn (ask for new information, ask for confirmation of a value, give an informational statement, etc.) and prompt type (asking a question, giving a statement, providing help, repeating informational content, responding to a 'no recognition' event, responding to a silence, etc.) to reveal and/or diagnose the most likely problems in the application.

For example, given a telephone system (with speech recognition or DTMF input) that takes several thousand calls a week, data analysis can be executed on the logs for a week of calls, and it will highlight likely problem areas met by all users of the application. Data analysis may also provide indications to types of problems such as but not limited to dialogs (tasks) which are 'under-performing', i.e. show a low level of usability, independently of their success/failure rate, and reasons for this; dialog states where the prompt is confusing to users; dialog states at which problems begin to surface for the greatest number of users.

As a result of this data analysis, a developer who is tuning the application is now able rapidly execute analysis to validate these problems and/or fix the tasks and states where necessary, without needing to analyze more data or calls. This represents a significant saving in time and cost of application maintenance and tuning.

DETAILED DESCRIPTION

Figure 1:
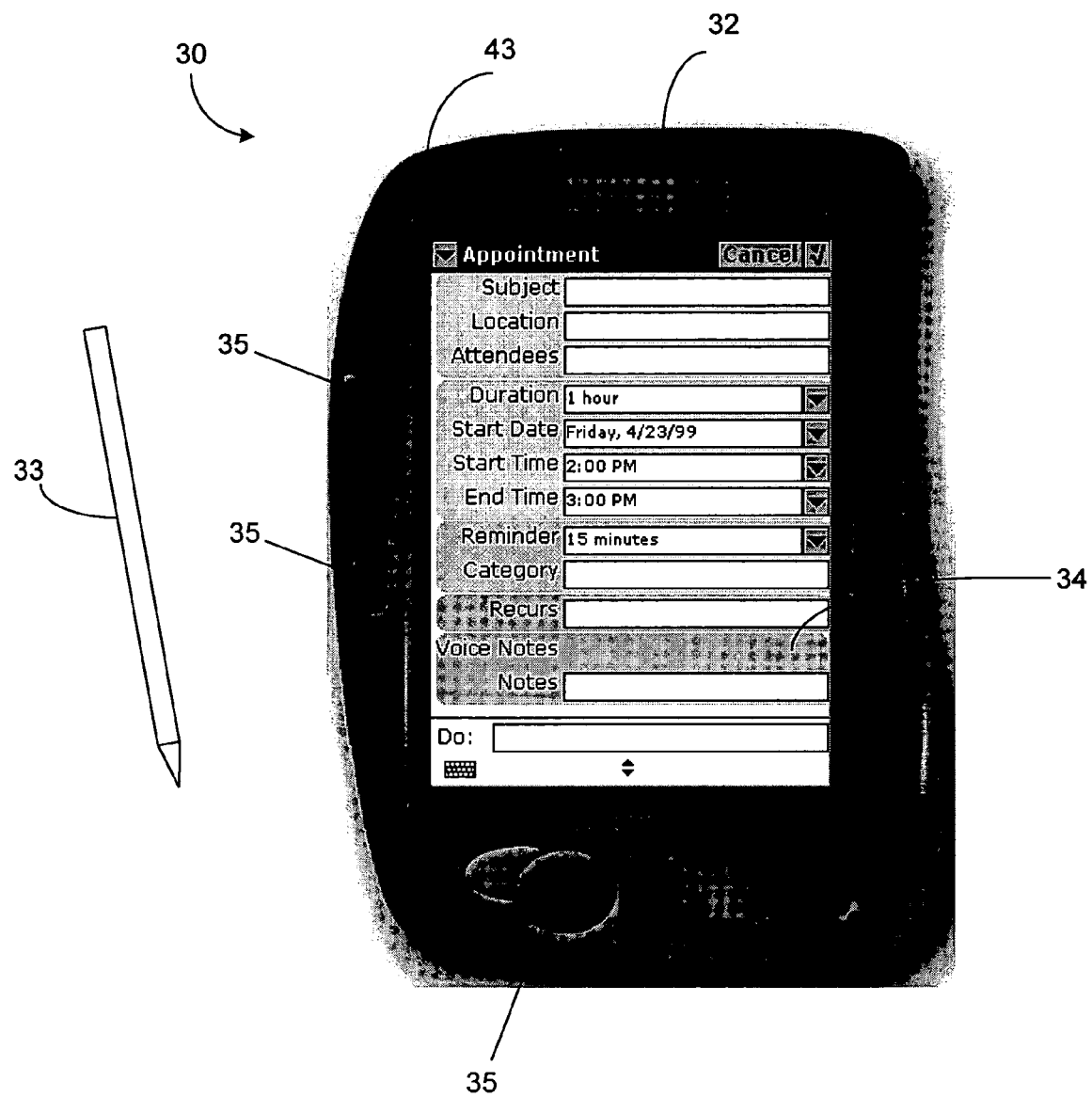
FIG. 1 is a plan view of a first embodiment of a computing device operating environment.

Before describing dialog analysis particularly, but not limited to a speech application and DTMF, it may be useful to describe generally computing devices that can be used in a speech application. Referring now to FIG. 1, an exemplary form of a data management device (PIM, PDA or the like) is illustrated at 30. However, it is contemplated that the concepts described herein can also be practiced using other computing devices discussed below, and in particular, those computing devices having limited surface areas for input buttons or the like. For example, phones and/or data management devices will also benefit from the concepts described herein. Such devices will have an enhanced utility compared to existing portable personal information management devices and other portable electronic devices, and the functions and compact size of such devices will more likely encourage the user to carry the device at all times. Accordingly, it is not intended that the scope of application herein described be limited by the disclosure of an exemplary data management or PIM device, phone or computer herein illustrated.

An exemplary form of a data management mobile device 30 is illustrated in FIG. 1. The mobile device 30 includes a housing 32 and has a user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the invention is not intended to be limited by these forms of input mechanisms. For instance, another form of input can include a visual input such as through computer vision.

Figure 2:
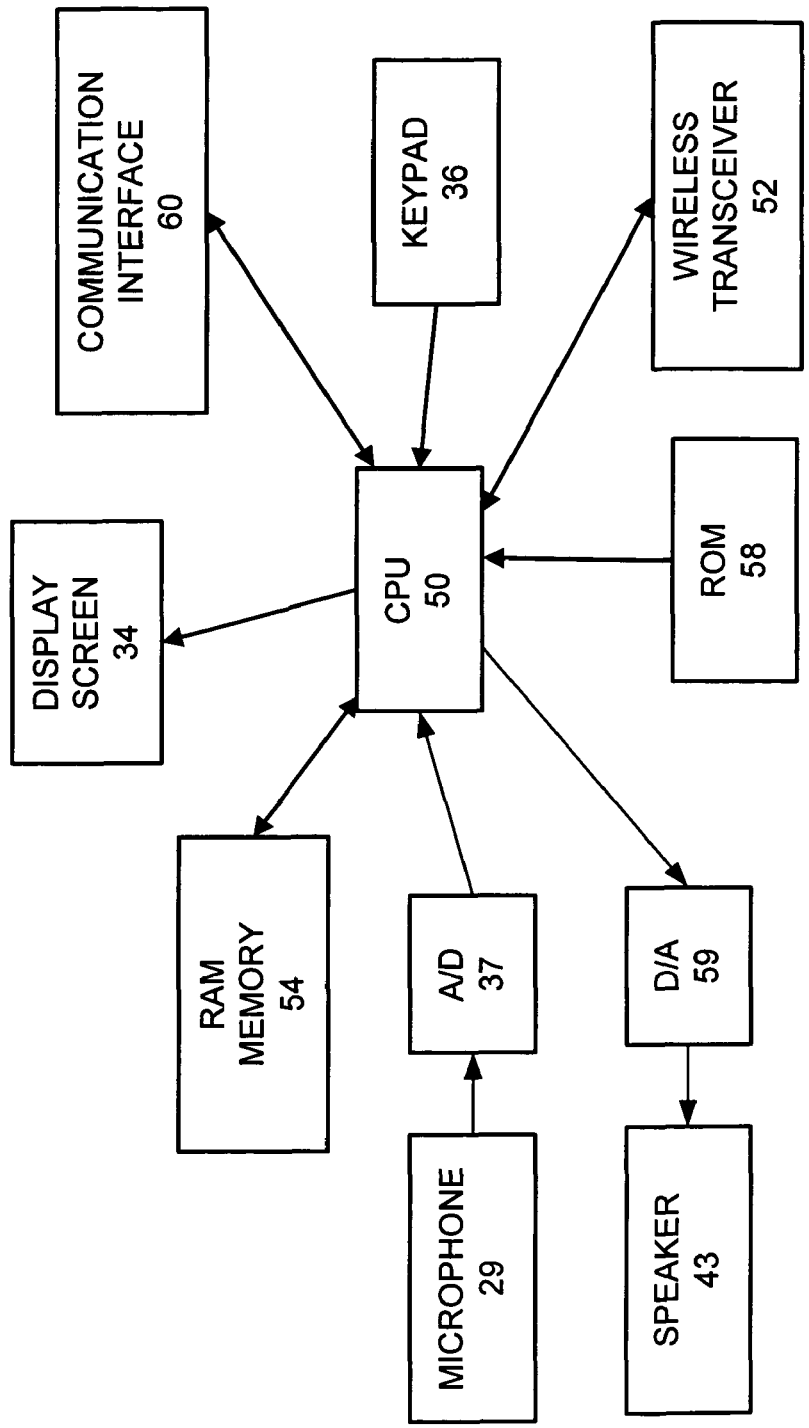
FIG. 2 is a block diagram of the computing device of FIG. 1.

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54).

RAM 54 also serves as a storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results. Using wireless transceiver 52 or communication interface 60, speech data may be transmitted to a remote recognition server 204 discussed below and illustrated in the architecture of FIG. 4. Recognition results may then be returned to mobile device 30 for rendering (e.g. visual and/or audible) thereon, and eventual transmission to a web server 202 (FIG. 4), wherein the web server 202 and mobile device 30 operate in a client/server relationship. Similar processing can be used for other forms of input. For example, handwriting input can be digitized with or without pre-processing on device 30. Like the speech data, this form of input may be transmitted to the recognition server 204 for recognition wherein the recognition results are then returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input.

In addition to the portable or mobile computing devices described above, it should also be understood that the concepts described herein can be used with numerous other computing devices such as a general desktop computer. For instance, a user with limited physical abilities can input or enter text into a computer or other computing device when other conventional input devices, such as a full alpha-numeric keyboard, are too difficult to operate.

The invention is also operational with numerous other general purpose or special purpose computing systems, environments or configurations. Examples of well known computing systems, environments, and/or configurations that may be suitable for use with the invention include, but are not limited to, wireless or cellular telephones, regular telephones (without any screen), personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Figure 3:
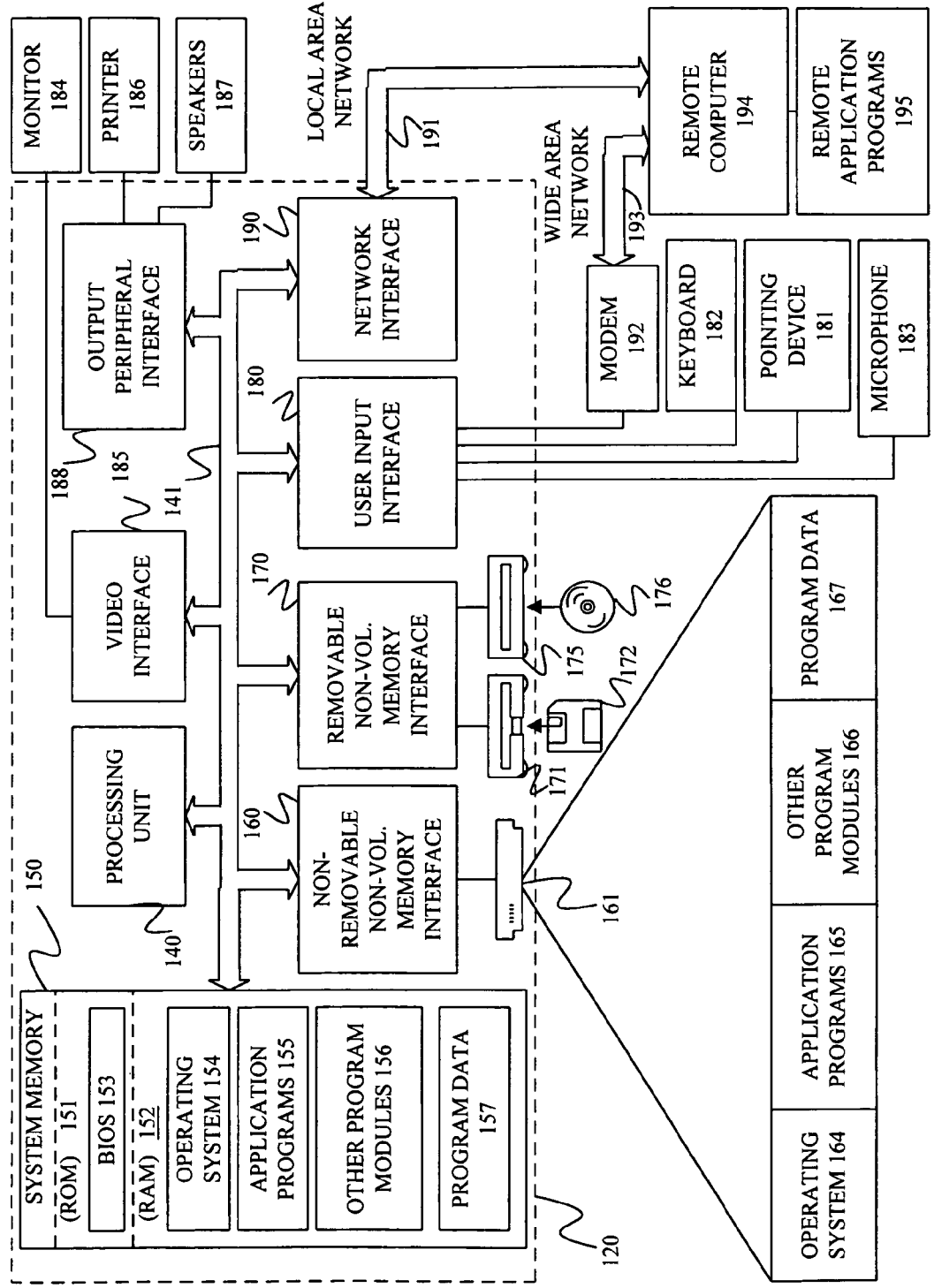
FIG. 3 is a block diagram of a general purpose computer.

The following is a brief description of a general purpose computer 120 illustrated in FIG. 3. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The description below may be provided in the general context of computer-executable instructions, such as program modules, being executed by a computer. Generally, program modules include routines, programs, objects, components, data structures, etc. that perform particular tasks or implement particular abstract data types. The exemplary embodiments herein described may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 3, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 3 illustrates operating system 54, application programs 155, other program modules 156, and program data 157.

The computer 120 may also include other removable/non-removable volatile/nonvolatile computer storage media. By way of example only, FIG. 3 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 3, provide storage of computer readable instructions, data structures, program modules and other data for the computer 120. In FIG. 3, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 3 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 3 illustrates remote application programs 195 as residing on remote computer 194. It will be appreciated that the network connections shown are exemplary and other means of establishing a communications link between the computers may be used.

Exemplary Embodiments

Figure 4:
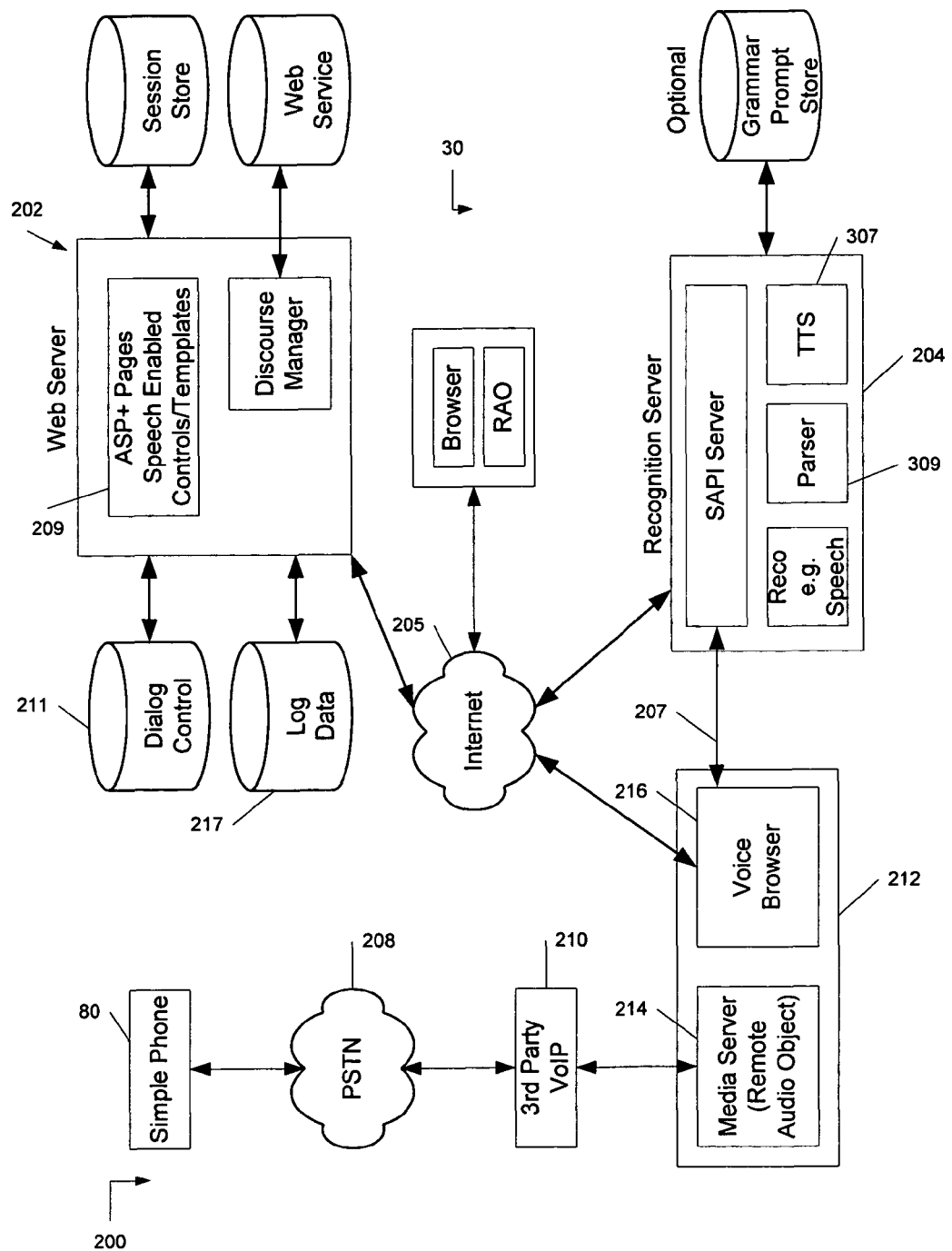
FIG. 4 is a block diagram of an architecture for a client/server system.

FIG. 4 illustrates architecture 200 for network based recognition (herein exemplified with a wide area network) as can be used with the concepts described herein. However, it should be understood, that interaction with remote components is but one embodiment in that a speech application including the recognizer may be operable on a single computing device with all necessary components or modules present therein.

Generally, information stored in a web server 202 can be accessed through mobile device 30 (which herein also represents other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

In this exemplary embodiment, architecture 200 is unified in that whether information is obtained through device 30 or phone 80 using speech recognition, a single recognition server 204 can support either mode of operation. In addition, architecture 200 operates using an extension of well-known markup languages (e.g. HTML, XHTML, cHTML, XML, WML, and the like). Thus, information stored on web server 202 can also be accessed using well-known GUI methods found in these markup languages. By using an extension of well-known markup languages, authoring on the web server 202 is easier, and legacy applications currently existing can be also easily modified to include voice or other forms of recognition.

Generally, device 30 executes HTML+ scripts, or the like, provided by web server 202. When voice recognition is required, by way of example, speech data, which can be digitized audio signals or speech features wherein the audio signals have been preprocessed by device 30 as discussed above, are provided to recognition server 204 with an indication of a grammar or language model to use during speech recognition. The implementation of the recognition server 204 can take many forms, one of which is illustrated, but generally includes a recognizer 211. The results of recognition are provided back to device 30 for local rendering if desired or appropriate. Upon compilation of information through recognition and any graphical user interface if used, device 30 sends the information to web server 202 for further processing and receipt of further HTML scripts, if necessary.

As illustrated in FIG. 4, device 30, web server 202 and recognition server 204 are commonly connected, and separately addressable, through a network 205, herein a wide area network such as the Internet. It therefore is not necessary that any of these devices be physically located adjacent to each other. In particular, it is not necessary that web server 202 includes recognition server 204. In this manner, authoring at web server 202 can be focused on the application to which it is intended without the authors needing to know the intricacies of recognition server 204. Rather, recognition server 204 can be independently designed and connected to the network 205, and thereby, be updated and improved without further changes required at web server 202. As discussed below, web server 202 can also include an authoring mechanism that can dynamically generate client-side markups and scripts. In a further embodiment, the web server 202, recognition server 204 and client 30 may be combined depending on the capabilities of the implementing machines. For instance, if the client comprises a general purpose computer, e.g. a personal computer, the client may include the recognition server 204. Likewise, if desired, the web server 202 and recognition server 204 can be incorporated into a single machine.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephone voice browser 212 includes a media server 214 that provides a telephony interface and a voice browser 216. Like device 30, telephony voice browser 212 receives HTML scripts or the like from web server 202. In one embodiment, the HTML scripts are of the form similar to HTML scripts provided to device 30. In this manner, web server 202 need not support device 30 and phone 80 separately, or even support standard GUI clients separately. Rather, a common markup language can be used. In addition, like device 30, voice recognition from audible signals transmitted by phone 80 are provided from voice browser 216 to recognition server 204, either through the network 205, or through a dedicated line 207, for example, using TCP/IP. Web server 202, recognition server 204 and telephone voice browser 212 can be embodied in any suitable computing environment such as the general purpose desktop computer illustrated in FIG. 3.

However, it should be noted that if DTMF recognition is employed, this form of recognition would generally be performed at the media server 214, rather than at the recognition server 204. In other words, the DTMF grammar would be used by the media server 214.

Referring back to FIG. 4, web server 202 can include a server side plug-in authoring tool or module 209 (e.g. ASP, ASP+, ASP.Net by Microsoft Corporation, JSP, Javabeans, or the like). Server side plug-in module 209 can dynamically generate client-side markups and even a specific form of markup for the type of client accessing the web server 202. The client information can be provided to the web server 202 upon initial establishment of the client/server relationship, or the web server 202 can include modules or routines to detect the capabilities of the client device. In this manner, server side plug-in module 209 can generate a client side markup for each of the voice recognition scenarios, i.e. voice only through phone 80 or multimodal for device 30. By using a consistent client side model, application authoring for many different clients is significantly easier.

In addition to dynamically generating client side markups, high-level dialog modules, discussed below, can be implemented as a server-side control stored in store 211 for use by developers in application authoring. In general, the high-level dialog modules 211 would generate dynamically client-side markup and script in both voice-only and multimodal scenarios based on parameters specified by developers. The high-level dialog modules 211 can include parameters to generate client-side markups to fit the developers' needs.

Generation of Client Side Markups

As indicated above, server side plug-in module 209 outputs client side markups when a request has been made from the client device 30. In short, the server side plug-in module 209 allows the website, and thus, the application and services provided by the application to be defined or constructed. The instructions in the server side plug-in module 209 are made of a complied code. The code is run when a web request reaches the web server 202. The server side plug-in module 209 then outputs a new client side markup page that is sent to the client device 30. As is well known, this process is commonly referred to as rendering. The server side plug-in module 209 operates on "controls" that abstract and encapsulate the markup language, and thus, the code of the client side markup page. Such controls that abstract and encapsulate the markup language and operate on the webserver 202 include or are equivalent to "Servlets" or "Server-side plug ins" to name a few.

As is known, server side plug-in modules of the prior art can generate client side markup for visual rendering and interaction with the client device 30. U.S. Patent Application Publication US 2004/0113908 entitled "Web Server Controls for Web Enabled Recognition and/or Audible Prompting," published Jun. 17, 2004 and U.S. Patent Application Publication US 2004/0230637A1 entitled "Application Controls for Speech Enabled Recognition," published Nov. 18, 2004, both describe three different approaches in detail for extending the server side plug-in module 209 to include recognition and audible prompting extensions. Although aspects of the present invention can be used with all of these approaches, a brief description of one approach will be provided below for purposes of explaining an exemplary embodiment.

Figure 5:
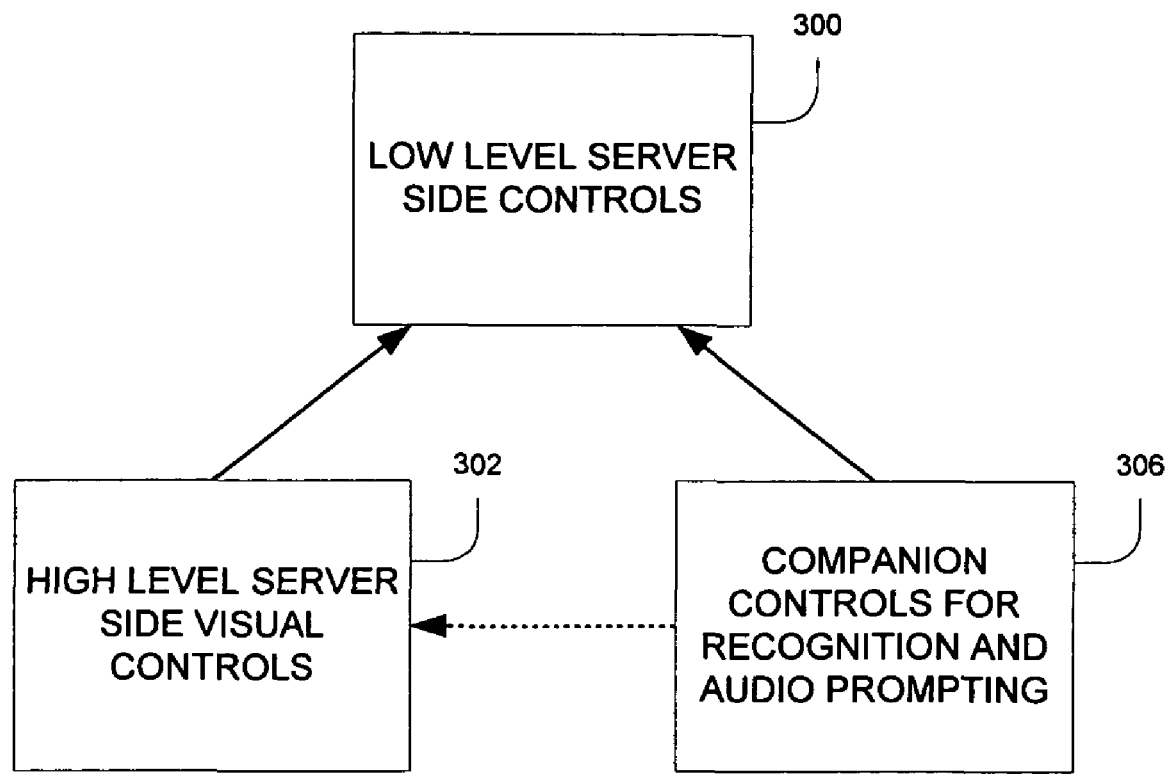
FIG. 5 is a block diagram illustrating an approach for providing recognition and audible prompting in client side markups.

Referring to FIG. 5, recognition/audible prompting controls 306 are separate from visual controls 302, but are associated selectively therewith as discussed below. In this manner, the controls 306 do not directly build upon the visual controls 302, but rather provide recognition/audible prompting enablement without having to rewrite the visual controls 302. The controls 306, like the controls 302, use a library 300. In this embodiment, library 300 includes both visual and recognition/audible prompting markup information.

There are significant advantages to this approach. Firstly, the visual controls 302 do not need to be changed in content. Secondly, the controls 306 can form a single module which is consistent and does not need to change according to the nature of the speech-enabled control 302. Thirdly, the process of speech enablement, that is, the explicit association of the controls 306 with the visual controls 302 is fully under the developer's control at design time, since it is an explicit and selective process. This also makes it possible for the markup language of the visual controls to receive input values from multiple sources such as through recognition provided by the markup language generated by controls 306, or through a conventional input device such as a keyboard. In short, the controls 306 can be added to an existing application authoring page of a visual authoring page of the server side plug-in module 209. The controls 306 provide a new modality of interaction (i.e. recognition and/or audible prompting) for the user of the client device 30, while reusing the visual controls' application logic and visual input/output capabilities. In view that the controls 306 can be associated with the visual controls 302 whereat the application logic can be coded, controls 306 may be hereinafter referred to as "companion controls 306" and the visual controls 302 be referred to as "primary controls 302". It should be noted that these references are provided for purposes of distinguishing controls 302 and 306 and are not intended to be limiting. For instance, the companion controls 306 could be used to develop or author a website that does not include visual renderings such as a voice-only website. In such a case, certain application logic could be embodied in the companion control logic.

Figure 6:
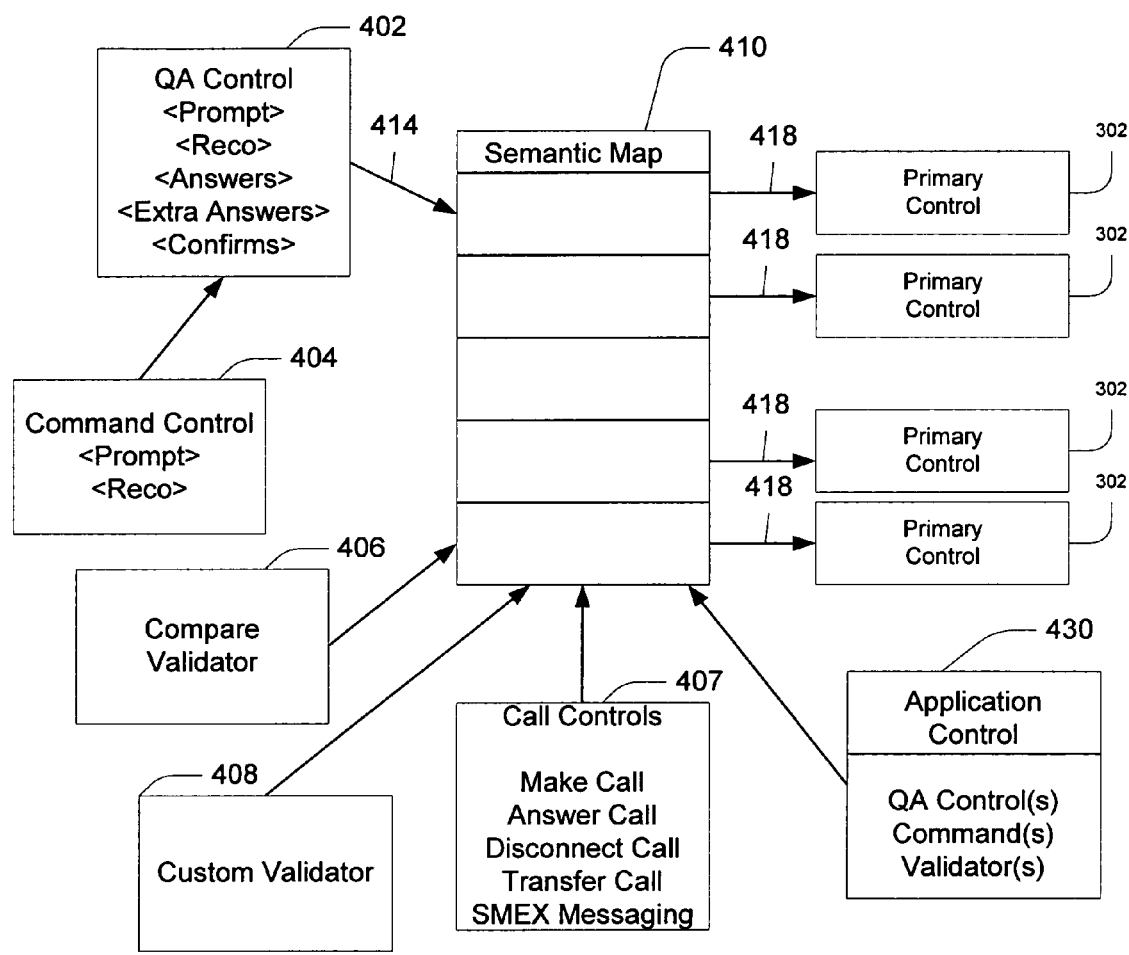
FIG. 6 is a block diagram illustrating companion controls.

A exemplary set of companion controls 400 is illustrated in FIG. 6. In this embodiment, the companion controls 400 generally include a QA control 402, a Command control 404, a CompareValidator control 406, a Custom Validator control 408 and a semantic map 410. The semantic map 410 schematically illustrated and includes semantic items 412, which can be considered as input fields, that form a layer between the visual domain primary controls 402 (e.g. HTML and a non-visual recognition domain of the companion controls 400.

The QA control 402 includes a Prompt property that references Prompt objects to perform the functions of output controls, i.e. that provide "prompting" client side markups for human dialog, which typically involves the playing of a prerecorded audio file, or text for text-to-speech conversion, the data included in the markup directly or referenced via a URL. Likewise, the input controls are embodied as the QA control 402 and Command Control 404 and also follow human dialog and include the Prompt property (referencing a Prompt object) and an Answer property that references at least one Answer object. Both the QA control 402 and the Command control 404 associate a grammar with expected or possible input from the user of the client device 30.

At this point, it may be helpful to provide a short description of each of the controls.

QA Control

In general, the QA control 402 through the properties illustrated can perform one or more of the following: provide output audible prompting, collect input data, perform confidence validation of the input result, allow confirmation of input data and aid in control of dialog flow at the website, to name a few. In other words, the QA control 402 contains properties that function as controls for a specific topic.

The QA control 402, like the other controls, is executed on the web server 202, which means it is defined on the application development web page held on the web server using the server-side markup formalism (ASP, JSP or the like), but is output as a different form of markup to the client device 30. Although illustrated in FIG. 6 where the QA control appears to be formed of all of the properties Prompt, Reco, Answers, ExtraAnswers and Confirms, it should be understood that these are merely options wherein one or more may be included for a QA control.

At this point it may be helpful to explain use of the QA controls 402 in terms of application scenarios. Referring to FIG. 6 and in a voice-only application QA control 402 could function as a question and an answer in a dialog. The question would be provided by a Prompt object, while a grammar is defined through grammar object for recognition of the input data and related processing on that input. An Answers property associates the recognized result with a SemanticItem 412 in the Semantic Map 410 using an Answer object, which contains information on how to process recognition results. Line 414 represents the association of the QA control 402 with the Semantic Map 410, and to a SemanticItem 412 therein. Many SemanticItems 412 are individually associated with a visual or primary control 302 as represented by line 418, although one or more SemanticItems 412 may not be associated with a visual control and used only internally. In a multimodal scenario, where the user of the client device 30 may touch on the visual textbox, for example with a "TapEvent", an audible prompt may not be necessary. For example, for a primary control comprising a textbox having visual text forming an indication of what the user of client device should enter in the corresponding field, a corresponding QA control 402 may or may not have a corresponding prompt such as an audio playback or a text-to-speech conversion, but would have a grammar corresponding to the expected value for recognition, and event handlers to process the input, or process other recognizer events such as no speech detected, speech not recognized, or events fired on timeouts.

In a further embodiment, the recognition result includes a confidence level measure indicating the level of confidence that the recognized result was correct. A confirmation threshold can also be specified in the Answer object, for example, as ConfirmThreshold equals 0.7. If the confirmation level exceeds the associated threshold, the result can be considered confirmed.

It should also be noted that in addition, or in the alternative, to specifying a grammar for speech recognition, QA controls and/or Command controls can specify Dtmf (dual tone modulated frequency) grammars to recognize telephone key activations in response to prompts or questions.

At this point it should be noted that when a Semanticitem 412 of the Semantic map 410 is filled, through recognition for example, speech or Dtmf, several actions can be taken. First, an event can be issued or fired indicating that the value has been "changed". Depending on if the confirmation level was met, another event that can be issued or fired includes a "confirm" event that indicates that the corresponding semantic item has been confirmed. These events are used for controlling dialog.

The Confirms property can also include answer objects having the structure similar to that described above with respect to the Answers property in that it is associated with a SemanticItem 412 and can include a ConfirmThreshold if desired. The Confirms property is not intended to obtain a recognition result per se, but rather, to confirm a result already obtained and ascertain from the user whether the result obtained is correct. The Confirms property is a collection of Answer objects used to assert whether the value of a previously obtained result was correct. The containing QA's Prompt object will inquire about these items, and obtains the recognition result from the associated SemanticItem 412 and forms it in a question such as "Did you say Seattle?" If the user responds with affirmation such as "Yes", the confirmed event is then fired. If the user responds in the negative such as "No", the associated SemanticItem 412 is cleared.

The Confirms property can also accept corrections after a confirmation prompt has been provided to the user. For instance, in response to a confirmation prompt "Did you say Seattle?" the user may respond "San Francisco" or "No, San Francisco", in which case, the QA control has received a correction. Having information as to which SemanticItem is being confirmed through the Answer object, the value in the SemanticItem can be replaced with the corrected value. It should also be noted that if desired, confirmation can be included in a further prompt for information such as "When did you want to go to Seattle?", where the prompt by the system includes a confirmation for "Seattle" and a further prompt for the day of departure. A response by the user providing a correction to the place of destination would activate the Confirms property to correct the associated semantic item, while a response with only a day of departure would provide implicit confirmation of the destination.

The ExtraAnswers property allows the application author to specify Answer objects that a user may provide in addition to a prompt or query that has been made. For instance, if a travel oriented system prompts a user for a destination city, but the user responds by indicating "Seattle tomorrow", the Answers property that initially prompted the user will retrieve and therefore bind the destination city "Seattle" to the appropriate SemanticItem, while the ExtraAnswers property can process "Tomorrow" as the next succeeding day (assuming that the system knows the current day), and thereby, bind this result to the appropriate SemanticItem in the Semantic Map. The ExtraAnswers property includes one or more Answer objects defined for possible extra information the user may also state. In the example provided above, having also retrieved information as to the day of departure, the system would then not need to reprompt the user for this information, assuming that the confirmation level exceeded the corresponding ConfirmThreshold. If the confirmation level did not exceed the corresponding threshold, the appropriate Confirms property would be activated.

Command Control

Command controls 404 are user utterances common in voice-only dialogs which typically have little semantic import in terms of the question asked, but rather seek assistance or effect navigation, e.g. help, cancel, repeat, etc. The Command control 404 can include a Prompt property to specify a prompt object. In addition, the Command control 404 can be used to specify not only the grammar (through a Grammar property) and associated processing on recognition (rather like an Answer object without binding of the result to an SemanticItem), but also a 'scope' of context and a type. This allows for the authoring of both global and context-sensitive behavior on the client side markup. The Command control 404 allows additional types of input such as "help" commands, or commands that allow the user of the client device to navigate to other selected areas of the website.

CompareValidator Control

The CompareValidator control compares two values according to an operator and takes an appropriate action. The values to be compared can be of any form such as integers, strings of text, etc. The CompareValidator includes a property SemanticItemtoValidate that indicates the SemanticItem that will be validated. The SemanticItem to be validated can be compared to a constant or another SemanticItem, where the constant or other SemanticItem is provided by properties ValuetoCompare and SematicItemtoCompare, respectively. Other parameters or properties associated with the CompareValidator include Operator, which defines the comparison to be made and Type, which defines the type of value, for example, integer or string of the semantic items.

If the validation associated with the CompareValidator control fails, a Prompt property can specify a Prompt object that can be played instructing the user that the result obtained was incorrect. If upon comparison the validation fails, the associated SemanticItem defined by SematicItemtoValidate is indicated as being empty, in order that the system will reprompt the user for a correct value. However, it may be helpful to not clear the incorrect value of the associated SemanticItem in the Semantic Map in the event that the incorrect value will be used in a prompt to the user reiterating the incorrect value. The CompareValidator control can be triggered either when the value of the associated SemanticItem changes value or when the value has been confirmed, depending on the desires of the application author.

CustomValidator Control

The CustomValidator control is similar to the CompareValidator control. A property SematicItemtoValidate indicates the SemanticItem that will be validated, while a property ClientValidationFunction specifies a custom validation routine through an associated function or script. The function would provide a Boolean value "yes" or "no" or an equivalent thereof whether or not the validation failed. A Prompt property can specify a Prompt object to provide indications of errors or failure of the validation. The CustomValidator control can be triggered either when the value of the associated SemanticItem changes value or when the value has been confirmed, depending on the desires of the application author.

Control Execution Algorithm

A client-side script or module (herein referred to as "RunSpeech") is provided to the client device for the controls of FIG. 6. The purpose of this script is to execute dialog flow via logic, which is specified in the script when executed on the client device 30, i.e. when the markup pertaining to the controls is activated for execution on the client due to values contained therein. The script allows multiple dialog turns between page requests, and therefore, is particularly helpful for control of voice-only dialogs such as through telephony browser 216. The client-side script RunSpeech is executed in a loop manner on the client device 30 until a completed form is submitted, or a new page is otherwise requested from the client device 30.

Generally, in one embodiment, the algorithm generates a dialog turn by outputting speech and recognizing user input. The overall logic of the algorithm is as follows for a voice-only scenario (reference is made to U.S. Patent Application Publication US 2004/0113908 entitled "Web Server Controls for Web Enabled Recognition and/or Audible Prompting," published Jun. 17, 2004 for properties or parameters not otherwise discussed above):

1. Find the first active (as defined below) QA, CompareValidator or CustomValidator control in speech index order.

2. If there is no active control, submit the page.

3. Otherwise, run the control.

A QA is considered active if and only if:

1. The QA's clientActivationFunction either is not present or returns true, AND

2. If the Answers property collection is non empty, the State of all of the SemanticItems pointed to by the set of Answers is Empty OR 3. If the Answers property collection is empty, the State at least one SemanticItem in the Confirm array is NeedsConfirmation.

However, if the QA has PlayOnce true and its Prompt has been run successfully (reached OnComplete) the QA will not be a candidate for activation.

A QA is run as follows:

1. If this is a different control than the previous active control, reset the prompt Count value.

2. Increment the Prompt count value

3. If PromptSelectFunction is specified, call the function and set the Prompt's inlinePrompt to the returned string.

4. If a Reco object is present, start it. This Reco should already include any active command grammar.

A Validator (either a CompareValidator or a CustomValidator) is active if:

1. The SemanticItemToValidate has not been validated by this validator and its value has changed.

A CompareValidator is run as follows:

1. Compare the values of the SemanticItemToCompare or ValueToCompare and SemanticItemToValidate according to the validator's Operator.

2. If the test returns false, empty the text field of the SemanticItemToValidate and play the prompt.

3. If the test returns true, mark the SemanticItemToValidate as validated by this validator.

A CustomValidator is run as follows:

1. The ClientValidationFunction is called with the value of the SemanticItemToValidate.

2. If the function returns false, the semanticItem cleared and the prompt is played, otherwise as validated by this validator.

A Command is considered active if and only if:

1. It is in Scope, AND

2. There is not another Command of the same Type lower in the scope tree.

In the multimodal case, the logic is simplified to the following algorithm:

1. Wait for triggering event—i.e., user tapping on a control;

2. Collect expected answers;

3. Listen in for input;

4. Bind result to SemanticItem, or if none, throw event;

5. Go back to 1.

In a multi-model environment, it should be noted that if the user corrects the text box or other input field associated with a visual presentation of the result, the system can update the associated SemanticItem to indicate that the value has been confirmed.

In a further embodiment as illustrated in FIG. 6, call controls 407 are provided that enable application authors to create speech applications that handle telephony transactions as well as an application control 430, which provides a means to wrap common speech scenarios in one control. Call controls 407 and application control 430 are not necessary for practicing the present invention, but are merely mentioned for the sake of completeness. A further discussion of each is provided in U.S. Patent Application Publication US 2004/0113908 entitled "Web Server Controls for Web Enabled Recognition and/or Audible Prompting," published Jun. 17, 2004 and U.S. Patent Application Publication US 2004/0230637A1 entitled "Application Controls for Speech Enabled Recognition," published Nov. 18, 2004.

Recording User Interaction Data

Using by way of example the foregoing structure, an application developer can develop a speech enabled application. However, aspects described herein allow the developer to record or log user interaction data.

Nevertheless, it should be understood that the concepts herein described are not limited to the dialog authoring structure described above to provide a dialog model, but rather can be applied to any authoring tool that generates a dialog model such as but not limited to those implemented as middleware, APIs (application program interfaces) or the like, and configured to record some or all of the information described below. In addition, the functional nature of speech enabled application such as telephony applications and the specifics of their voice user interfaces can differ widely across domains and application types so any automated logging enabled typically is only heuristic and not deterministic. For this reason, an implementation of this is likely to implement the automated log event properties as overridable defaults, rather than unchangeable properties. Nevertheless to simplify and facilitate the logging of rich information is still a big advance over systems relying on manual and programmatic authoring.

Referring back to FIG. 4, web server 202 executing the speech enabled application pursuant to dialog controls 211, records user interaction log data in store 217 as the application executes for any type of user such as but not limited to access via mobile device 30 or via phone 80.

The application is commonly, all that not exclusively, defined or written as a set of hierarchical controls herein exemplified typically by QA Controls 402 in conjunction with Command Control 404, Application Control 430, Call Control 407 and Validators 406 and 408 as required. The hierarchy defines an overall task to be completed as well as sub-tasks thereof to complete the overall task. The number of levels in the hierarchy is dependent upon the complexity of the application. For instance, an application can be directed overall to making an airline reservation (i.e., the highest most task), while two major sub-tasks are directed to obtaining departure information and arrival information. Likewise, further sub-tasks can be defined for each of the major sub-tasks of obtaining departure information and obtaining arrival information, in particular, obtaining departure/arrival airport information, departure/arrival time, etc. These subtasks might appear in a sequence within their containing task.

Figure 7:
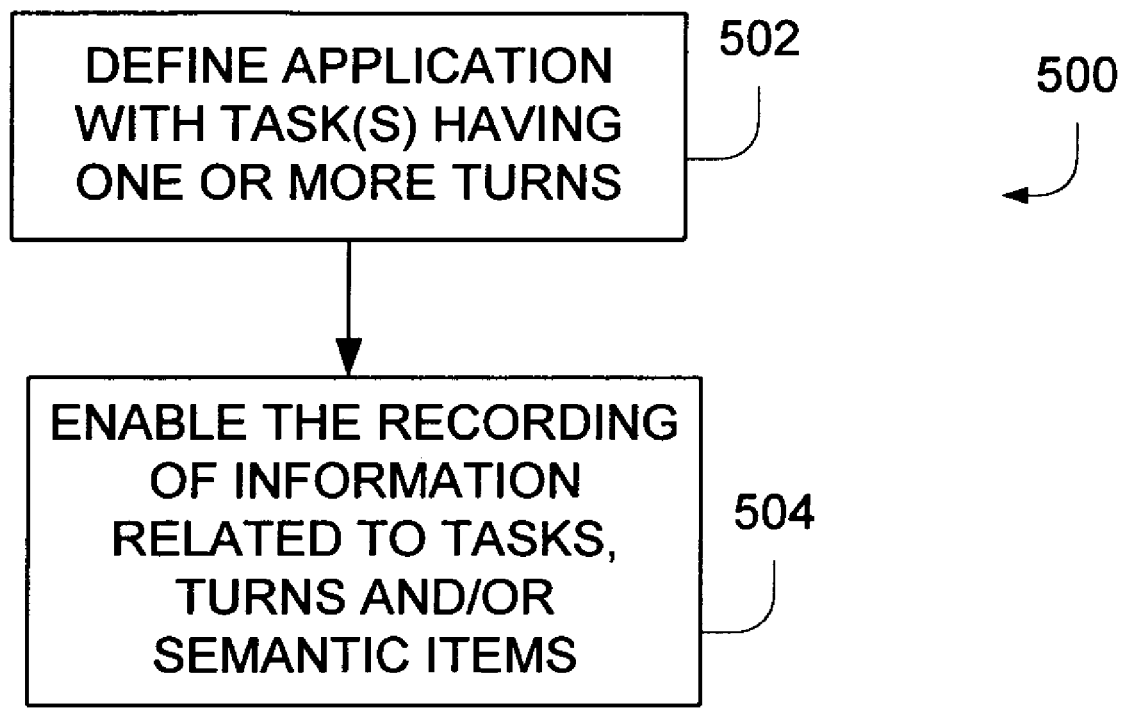
FIG. 7 is a flow chart of a method for creating a speech enabled application.

In general, two types of data are recorded, Task/Dialog data and Turn data. Beginning with Task/Dialog data, this data, as represented in the logs, should capture the hierarchical or sequential structure of the application in terms of tasks and subtasks. FIG. 7 illustrates a method 500 for creating an application. The dialog authoring tool enables the authoring or defining of dialogs at step 502 in terms of nested or sequential Task units, so that when a developer writes a speech enabled application, the author will typically write it in a modular fashion. That is, the author will be encouraged to group individual Turns into sets that accomplish a particular Task, and to group individual tasks into sets that accomplish higher level Tasks. Since the Task structure and the flow in and out of individual Tasks is known at design time, the logging of entry and exit to or from a Task is enabled (e.g. through TaskStart and TaskComplete events) as well as Turn data and values obtained from the user for input fields used by the application (herein exemplified as "semantic items") at step 504 to provide automated loggingof the sequence and/or hierarchy of Task structure. This means that dialog flow, values obtained and Task structure can be explicitly recovered and built from the event logs. It should be noted that steps 502 and 504 are shown separately for purposes of explanation only in that some or all the features of these steps may be performed in a different order or concurrently.

This data also quantifies the success, failure or other (e.g. unknown) status of completing any given task or subtask. In addition, the Task/Dialog data includes a reason if the task is unsuccessful or fails, or the reason for which its completion status is not known, or if applicable the reason for succeeding if multiple reasons are possible for succeeding. Additional data can include progress data indicating if the user did not provide a response or the speech recognizer could not recognize the utterance. A list of input field values or storage locations used by the application for values based on or associated with prompts or user responses, or the status thereof that changed can also be recorded.

Figure 8:
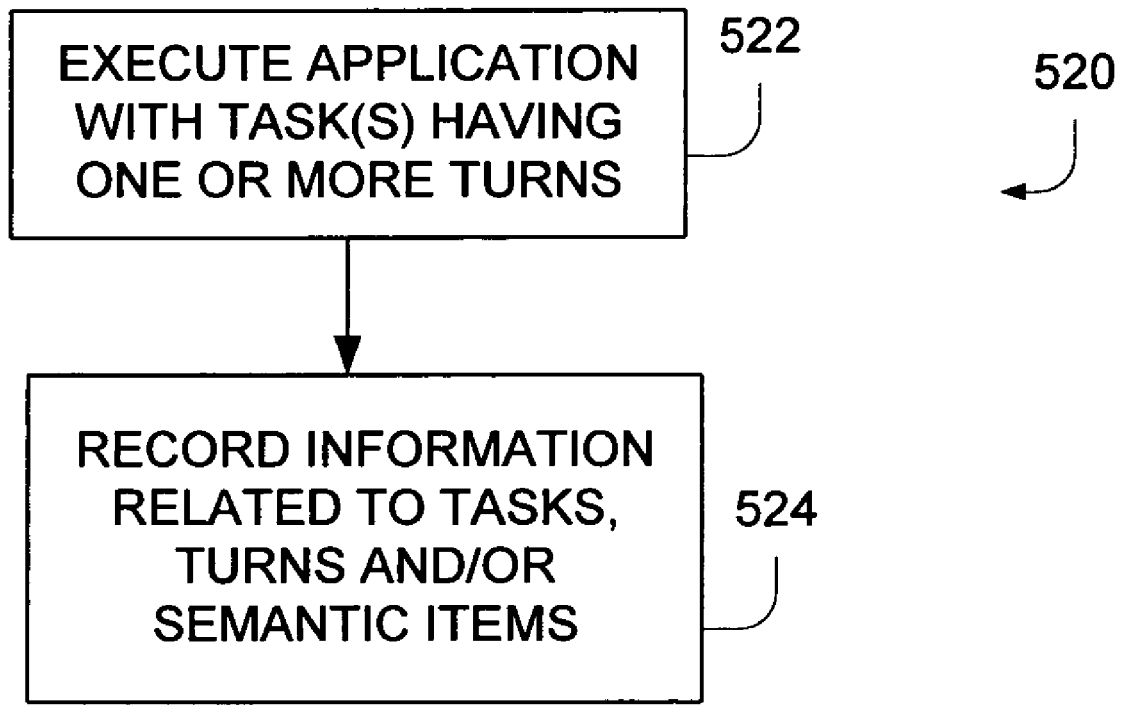
FIG. 8 is a flow chart a method of execution of a speech enabled application.

FIG. 8 illustrates a method 520 for execution of a speech enabled application. Method 520 includes executing a speech enabled application defined in terms of Task(s) having one or more Turns at step 522. Step 524 includes recording information related to Tasks, Turns and semantic items. It should be noted that steps 522 and 524 are shown separately for purposes of explanation only in that some or all the features of these steps may be performed in a different order or concurrently.

In one embodiment, the Task/Dialog data includes some or all of the following information:

Task/Dialog Data
  name: author-defined string identifier for Task/Dialog, e.g. "getCreditCardInfo", "ConfirmTravel", etc. If author supplies no name at design time, default names are given, e.g. Dialog1, Dialog2, DialogN, . . . .
  parent: name of containing Dialog (in order to reconstruct the dialog hierarchy from the logs)
  TaskStart: the timestamp when the Task/Dialog is first entered
  TaskComplete: the timestamp when the Task/Dialog is exited. This event should always be fired, bottom-up, for any open dialogs at the close of an application with default values (i.e. there will be no 'open-ended' dialogs in the logs).
  status: completion status of the task/dialog, is settable by the author, automatically inferred based on performance of the dialog, or semi-automatically set based on author defined conditions. In one embodiment, the default value status may be "UNSET", where subsequent values can be one of:
  SUCCESS
  FAILURE
  UNKNOWN Automatic Task Completion Status In certain cases, as indicated above, the status can be inferred with reasonable certainty from the nature of a task exit whether its status was one of success, failure, or unknown. For instance, a task that ends as a result of an error or exception can be automatically logged with completion status of Failure. Likewise, a cancelled task (e.g. where a Cancel ( ) method was called on the task object) can be automatically logged with completion status of Failure. Similarly, a task that ends as a result of a certain 'strikeout' (e.g. MaxSilences or MaxNoReco, discussed below) count being reached will be automatically logged with completion status of Failure.

In contrast, a task that ends naturally (i.e. it is not cancelled) with all semantic items (i.e. input fields for the application) of the Turns encountered in that task, or specified at design-time as belonging to that task, having grounded (user input or derived therefrom) values will be logged automatically with completion status of Success.

Semi-Automated Task Completion

Partial automation of task status logging is also useful. For any given task, the author can specify or define a set of conditions at step 502 for task success or failure, which, if met determine the status of the task at any point of exit. The conditions may be programmatic (e.g. foo='bar'), or more helpfully, conditions can be simplified such that the author need only specify one or more semantic items per task (e.g. values provided for departureCity and arrivalCity), and the system will automatically log Success when those semantic items have confirmed values, and, optionally, Failure when those semantic items do not have confirmed values.

This aspect is a useful time-saving mechanism since it means that the task status logging need not be programmatically coded on every exit point from a task. Instead, the conditions are automatically evaluated whenever an end-user exits the task, and the status determined and logged without extra developer code.

reason: reason for the completion of the dialog, can be set by author, e.g.

Command—command spoken by user to change to different portion of dialog, and the nature of the command (e.g. "Cancel", "Operator", "Main Menu", etc.;

userHangup—user hung up or otherwise quit or gave up;
  applicationError—application error occurred
  maxNoRecos—maximum number of utterances without recognition reached;
  maxsilences—maximum number of silent user responses reached;

SemanticUpdate:

items: list of any semantic items whose value/status were changed, including new values and corresponding statuses. Typically, this data is correlated with the Turn data, discussed below, in that with each dialog turn (prompt by application/response or lack thereof by user) one or more of the semantic items values and/or status will change. However, in some instances the application may change a semantic item by itself. For instance, if the application is unable to validate a value such as a credit card number, it might clear the value by itself and not necessarily based on a dialog turn. Such a change would be recorded nevertheless.

The Turn data comprises direct interaction with the application and is organized based on prompts provided by the application (when no response is expected), or application prompts correlated to user responses or lack thereof, in other words a prompt/response exchange, or commands provided by the user not necessarily in response to a prompt, or at least a response that is not expected to be a response to the prompt. Accordingly, the three areas of data that can be recorded include the information related to the prompt provided by the application, the response (be it an expected or unexpected response) provided by the user and the recognition result determined by the system. In one embodiment, the Turn data includes some or all of the following information:

Turn Data

Config name: author-defined string identifier. If author supplies no name at design time, default names can be given; however, there is a need to clearly and consistently distinguish between different turns within the same Dialog/Task. A possible technique is to base the name and the type of prompt.

type: The specification of the purpose of a particular Turn can be inferred from the nature of the semantic items associated with it. In the case of the foregoing description above, semantic items are associated with a Turn through the notion of Answers, ExtraAnswers and Confirms.

Examples of Turn purpose include:
  Ask for new information (Turn enables Answers)
  Confirm related information (accepting/denying, Turn enables Confirms)
  Give an informational statement (Turn holds no Answers or Confirms).

parent: name of containing Dialog/Task (in order to reconstruct the dialog hierarchy from the logs).
 language: language being used.
 speech grammars: information related to which speech recognition grammars are being used.
 DMTF grammars: information related to which DMTF recognition grammars are being used.

thresholds: confidence thresholds for rejecting a value and/or confirming a value.
 timeouts: time periods allowed for initial silence following the prompt, end silence for determining the end of response and the time period considered to be babble.

Prompt name: optional may not be necessary in that the turn data name can be used.

type: A dialog model may contain a number of predefined prompt types, any of which can be selected by the application, and the usage of which allows recording what the system is trying to do to achieve, i.e. the purpose of the Turn.

Examples of prompt types include:
  MainPrompt—asking a question (or giving a statement)
  HelpPrompt—providing help
  RepeatPrompt—repeating informational content
  NoRecognitionPrompt—responding to a 'no recognition'
  SilencePrompt—responding to a silence
  EscalatedNoRecognitionPrompt—responding to a 'no recognition' after multiple tries
  EscalatedSilencePrompt—responding to a silence after multiple tries Since these types are pre-defined and available for selection at any time, they can be logged automatically by type, which enriches the log data automatically with the notion of the purpose of a given prompt to attain the goal of the Turn.

Thus, the prompt type combined with the Turn type—all of which are programming primitives in the dialog authoring model and are thus automatically logged when encountered by the application allows a rich view of the system's purpose at any point in the logs.

semantic items: the semantic item(s) that are prompted about (used to link ask/confirm cycles, etc.)

The dialog model uses the notion of semantic items, each containing a value and a status, in order to simplify about dialog flow authoring. By logging the changing value and status of every semantic item automatically, and combining that with tasks and user/system move information, the logs are further enriched.

The Answers/ExtraAnswers/Confirms model links semantic items to Turns and therefore Tasks. Therefore it is known (and can be logged automatically), which semantic items are relevant to which system moves and which user moves, and which contribute to which Tasks.

textual content of the prompt: e.g. "welcome"
 bargein: on/off/mid-prompt time
 User Perceived Latency: the time period between a user's response and the playing of the next prompt. When a system is under heavy load, the time period may be longer, which could cause the user to be confused in that the user may believe the application is not responding.
 TTS: True/False—was text-to-speech being used to generate the prompt.
 prompt completion time: the time the prompt was completed/cut-off.
 prompt wave file: the actual prompt provided.

User Input:

mode: whether the user is providing DTMF/speech
 type: whether the user is providing a Command, and if so what type (e.g. Help/Repeat/etc.), or whether the user is providing a Response, and if so what type (Answer/Confirm/Deny)
 The dialog model categorizes the functions of the application's grammars into different types of user response that indicate the purpose(s) of the user in providing the response, i.e. Answer, Accept, Deny, etc. These types can be logged directly as indicators of what the system believes the user is trying to accomplish. Examples of different response types are as follows:

Answer—the user provided an answer to a question requesting a value.

ExtraAnswer—the user provided an answer that was beyond the focus of the question.

Accept—the user confirmed a piece of information.

Deny—the user refuted a piece of information.

Help Command—the user asked for help.

Repeat Command—the user requested a repetition of information.

Other Command—the user issued some other form of command (not explicitly typed, but we know it wasn't any of the above types).

Silence—the user did not say anything (this is sometimes used as a form of 'implicit acceptance').

Because these types are associated with particular grammars, they can be logged automatically whenever the user says something that matches the corresponding grammar. Many systems allow a single dialog turn to include multiple types—e.g. acceptance of more than one item, or answering one item and accepting another in a single turn.

Silence: If silence is detected, which number or count is it relative to MaxSilences.

NoReco: If no recognition is detected for the utterance, which number or count is it relative to MaxNoRecos.

Error: If an error occurred was it thrown by the application or the platform.

Result:

Recognition result: Recognition result returned by the system. Commonly, the recognition result includes semantic markup language (SML) tags for the interpreted utterance. In addition, N-Best alternative interpretations can be provided, and audio recording results where appropriate.

In addition for each interpretation:

utterance text without SML tags (if speech is provided) or keypresses (if DTMF is provided).

confidence: confidence level of the interpretation.

semantic mappings: link between parts of the SML result and the semantic items. In other words, what values from the SML result will be placed in which semantic items.

grammar rule matched: which rule in the grammar was matched by the users input.

confidence: of utterance as a whole.

bargein: timing of barge in by the user, or NULL (if no barge in was present).

recognition wave file: actual recorded user input or a pointer to it.

In summary, the logged user interaction data allows the dialog to be seen as a hierarchical or sequential structure of tasks operating on certain fields of interest (e.g. form fields, or slot values), and each dialog turn within a task logs both the system purpose (the dialog move) with respect to the form fields (e.g. asking for the value, confirming it, repeating it, etc.), and what the speech recognizer believes to be the user purpose (e.g. supplying the value, denying it, asking for help, etc.).

Practical benefits are realized with this structure. In particular, analysis of system performance is improved in that a task completion of either success or failure is generally explicit, so transactional success rate reporting is greatly simplified, and the nature of the dialog steps taken to complete the task is better understood (because the purpose behind each step is known at authoring time).

Implementation of this form of data logging is easy due to the manner in which it is incorporated into the dialog authoring tools. The high level nature of this instrumentation is general to a wide variety of application types, and the actual details of the logging are facilitated at authoring-time by its integration into the authoring tools both conceptually and with respect to the logging primitives. So the application author is encouraged to structure the application using the task/subtask model and indicate which transitions out of a task indicate a successful completion, and they need not explicitly instrument the system/user purpose logging because that is built into the dialog turn authoring model.

Dialog Analysis

The descriptions below generally refer to analysis at a task level; however, all the principles apply at both task and session level (i.e. analysis of a session as a single task, where lower level task structuring is unknown or ignored).

Figure 9:
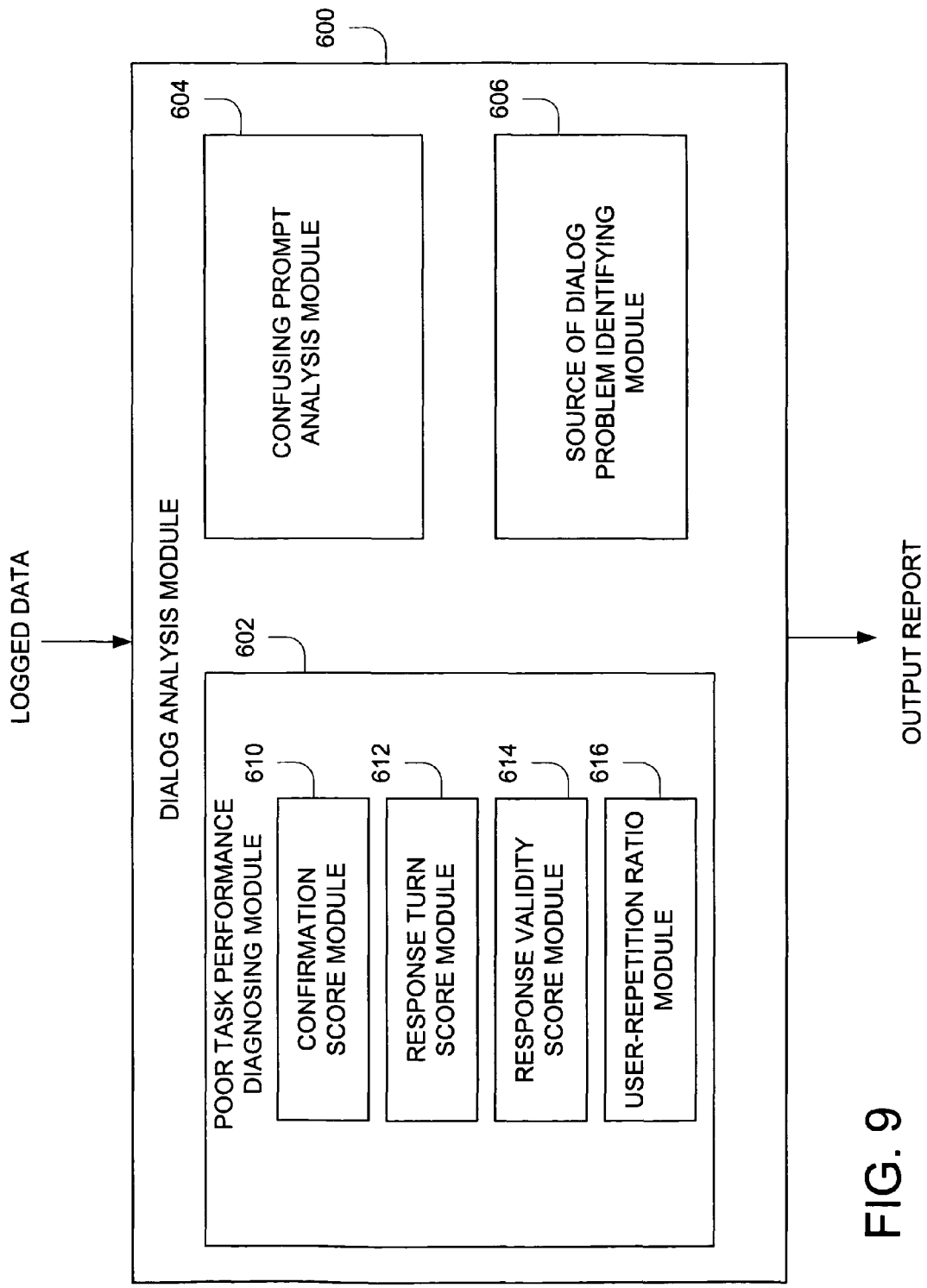
FIG. 9 is a block diagram of a dialog analysis module.

Referring to FIG. 9, dialog analysis module 600 receives input logged application data such as described above and performs analysis thereof. Generally, for explanation purposes, the dialog analysis module 600 can include a poor task performance diagnosing module 602, a confusing prompts analysis module 604, and a module 606 for identifying the source of dialog problems. Although they can be used advantageously in combination, each process or module can be used independently of the others. Reports or other suitable outputs can be provided indicating the values of the measures below. If applicable, the measures can be provided on a task basis.

1. Diagnosing Poor Task Performance

Figure 10:
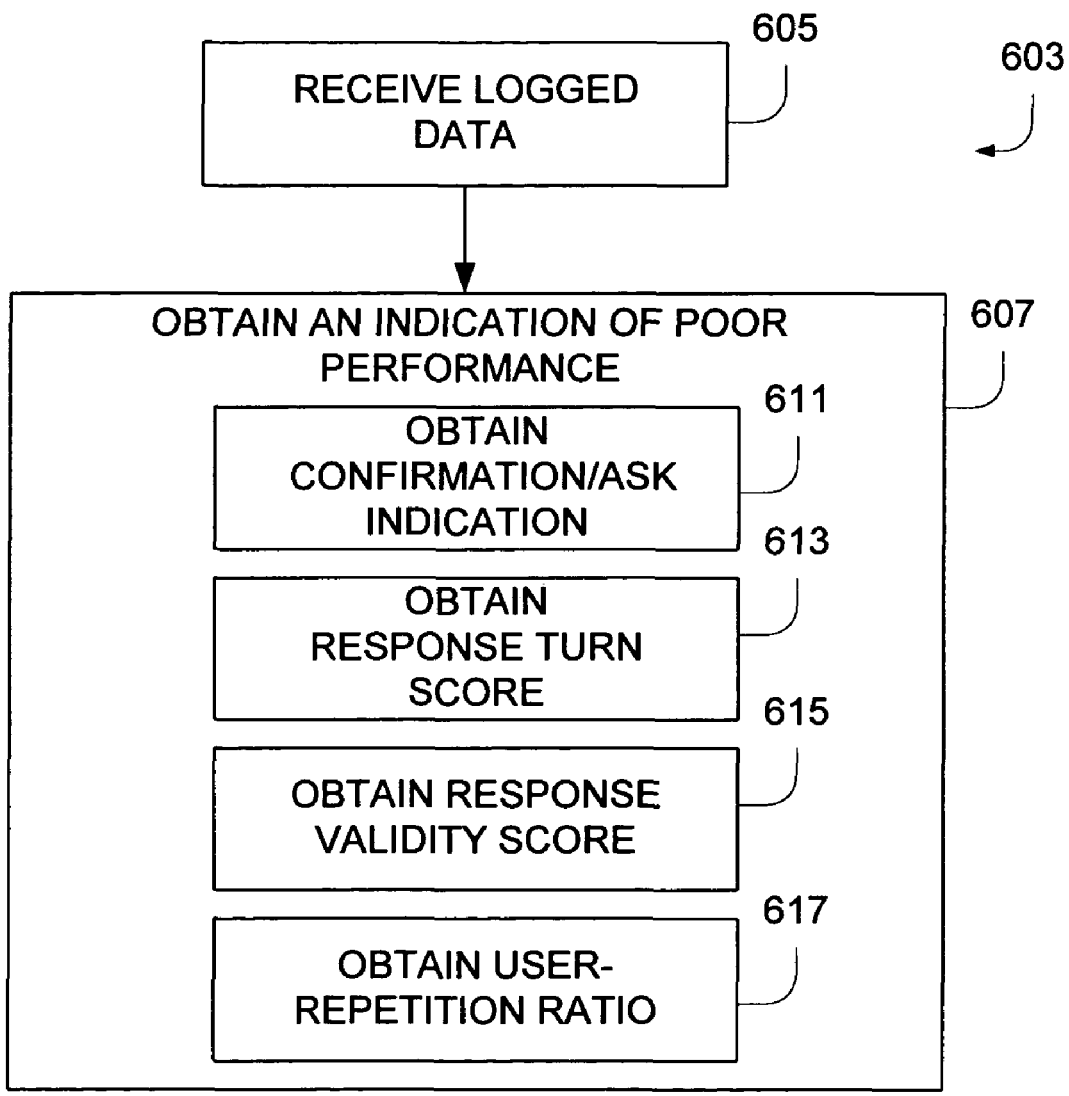
FIG. 10 is a flow chart of a method for performing dialog analysis with respect to poor performance.

The poor task performance diagnosing module 602 and its corresponding process 603 of FIG. 10 reveals or identifies poorly performing parts of the application that should be analyzed and tuned, and/or suggests reasons for poor performance. It analyzes each session or task from logged data at step 605 (a task is a structured component of the dialog containing dialog turns, subtasks, or both) and infers a measure of 'task usability' at step 607. This measure, and in particular the measures described below, is an indicator of the success of the user experience, based on the patterns of dialog move sequences (indicated for example by Turn types or Response types) used to accomplish the task.

Process 603 can be used either independently of or in combination with the explicit indicators of task success/failure and other metrics that are present in the logged data. These indicators are a result of explicit application instrumentation that determines how the status of a task should be logged on its completion—typically with values Success/Failure/Unknown—and are used to generate reports on overall task completion rates. Other explicit indicators include raw turn counts and durations. Used alone, the explicit indicators give little insight into the user experience of the task; however, the analysis described here provides deeper insights. It is valuable for assessing task performance across all tasks (from those with low completion rates to those with high completion rates), since it provides measures of the efficiency and usability of the task. These can be used for predicting likely reasons for overall task performance and/or as metrics on which to enhance performance and optimize the user experience.

One, some or all of the following metrics can be calculated from all instances of a given task across the data set used for analysis.

Confirmation Score

Module 610 obtains an indication relating to turns concerning confirmation of a received response relative to turns concerning asking for a received response at step 611. In the exemplary embodiment, module 610 calculates a confirmation score, which is a value indicative of "Confirms" turns relative to "Asks" turns. For instance, a ratio can be calculated by summing the number of "Confirm" turns and dividing this by the number of "Ask" turns. In this manner, a confirmation ratio of "1" indicates an equal number of Asks and Confirms in the task. In general, a lower ratio (using this example) would indicate more efficient dialog interaction (although some applications may require for business reasons an explicit verification of every Ask). Reasons for high confirmation levels (i.e. more "Confirms" occurring than desired) may be indicative of poorly designed dialog flow, sub-optimal confidence thresholds and/or grammar problems. As appreciated by those skilled in the art, different measures for comparing "Confirms" to "Asks" can be used. However, generally normalization (e.g. use of ratios for determining the score) can be advantageous, because it allows one to compare one task relative to another task, irrespective of the fact that the number of prompts and answers may be different for each task.

Semantic Item Turn Score

Module 612 obtains an indication relating to turns concerning asking for a received response relative to task instances in which the asking of the response appears across the data at step 613. In the embodiment illustrated, module 612 calculates a semantic item or response turn score, which is calculated on a per semantic item (SI) basis, by summing the number of Ask turns for the SI and dividing this by the number of task instances in which the asking of the semantic item appears across the data. (As used herein semantic items record the responses provided by the user.) By calculating this score on the basis of the semantic item, it gives an insight into the difficulty of obtaining a value for a particular semantic item—a high ratio indicates multiple attempts were made to ask for the item; a low value represents few attempts.

An example may be that this process identifies that it is difficult to obtain a credit card number without failing because the user has to provide numerous digits all at once. For instance, depending on the application such a prompt may occur at a number of positions in the dialog; however the same semantic item is used. If this is the case, a solution may be to ask the user for smaller sets of the credit card number.

It should be noted if desired, for tasks having multiple SIs (responses from the user), a single representative score can be calculated as the mean of all individual SI turn scores.

Semantic Item Validity Score

Module 614 obtains an indication relating to turns concerning confirming a received response relative to a value being assigned based on the received response at step 615. In the embodiment illustrated, module 614 calculates a semantic item or response validity score, which can be calculated on a per response or semantic item (SI) basis, by summing the number of times a value for the SI was confirmed, and dividing this by the total number of times a value was assigned to the SI. This score gives an insight into the efficiency of task(s) used to obtain the semantic item—an insight which might otherwise be obscured by high turn count or Confirmation scores. A high value for the semantic item validity score represents a high acceptance rate; whereas a low value represents a high rejection rate. It should be noted if desired, for tasks having multiple SIs (responses from the user), a single representative score can be calculated as the mean of all individual SI validity scores.

User-Repetition Ratio

Module 616 obtaining an indication relating a user repeating a turn based on a user request at step 617. In the illustrated embodiment, module 616 calculates a user-repetition score, which is calculated on a per turn basis by summing the number of repeated entries to the turn (where the re-entry was due to a user request as opposed to silence and non-recognition) and dividing this by the overall number of occurrences of the turn. User requests to repeat typically include the commands Help, Repeat and Go Back, but could include any command which results directly in re-entry to the current or previous state. A high value indicates a high level of re-entry, which implies user confusion beginning at that state, a low value indicates low levels of re-entry.

2. Confusing Prompts

Figure 11:
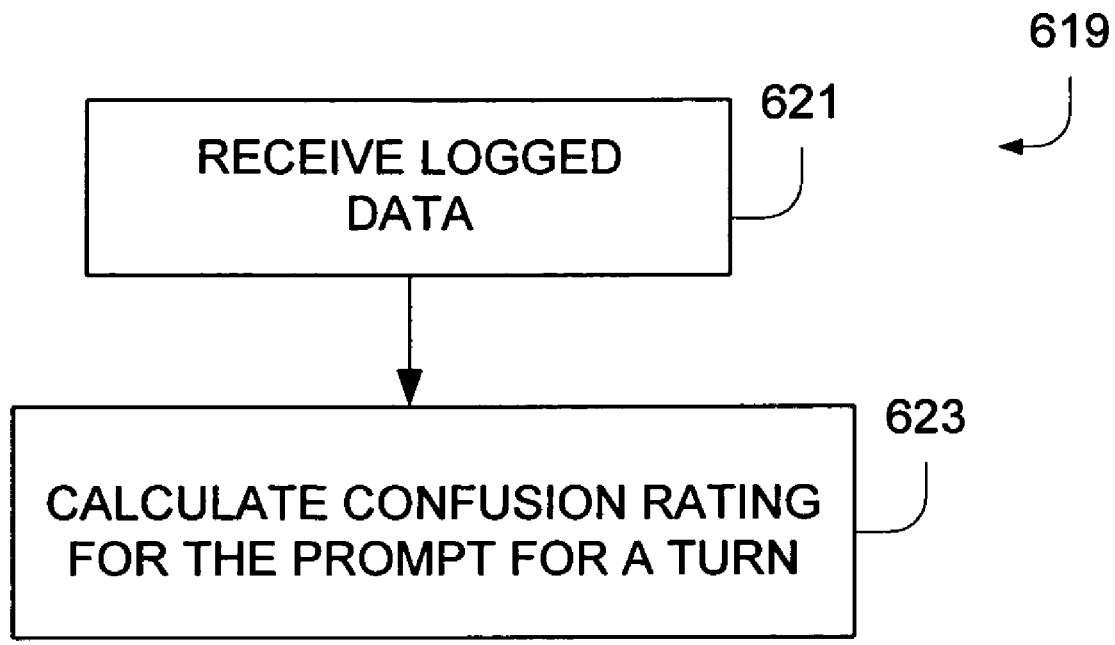
FIG. 11 is a flow chart of a method for performing dialog analysis with respect to confusing prompts.

Module 604 and a corresponding process 619 (FIG. 11) are used to obtain an indication of which prompts in an application are causing confusion. At step 621 logged data is received for the prompt of a given Turn, while a 'confusion rating' is calculated at step 623 in order to determine whether the prompt wording should be tuned for clarity or simplicity. In this example, the higher the rating, the more likely the prompt needs to be tuned.

An exemplary confusion rating can be calculated from the following occurrences:

(a) Silence count: the number of times a user silence (no input) followed the prompt;
(b) Help count: the number of times a user request for assistance followed the prompt;
(c) Repeat count: the number of times a user requested the system to repeat the prompt;
(d) Denial rate: (for turns of Type Ask): the number of times a Semantic Item value (i.e. a recognized response to the prompt) was denied or otherwise cancelled.

These individual totals are summed over the number of instances of the prompt in the data. It should be noted different weighting factors can be applied to components (a)-(d). The resulting rating can be used alone, or it can be combined with a factor calculated from lower level recognizer data that reflects the user's time to understand the response:

(e) response latency: for example the average (or other measure) latency between the end of the prompt and the beginning of the user response. (This assumes that a person responds to a confusing prompt slower than a prompt that is not confusing.) It should be noted that this score by itself may provide an indication of the confusion rating of prompts.

3. Identifying the Source of Dialog Problems

Figure 12:
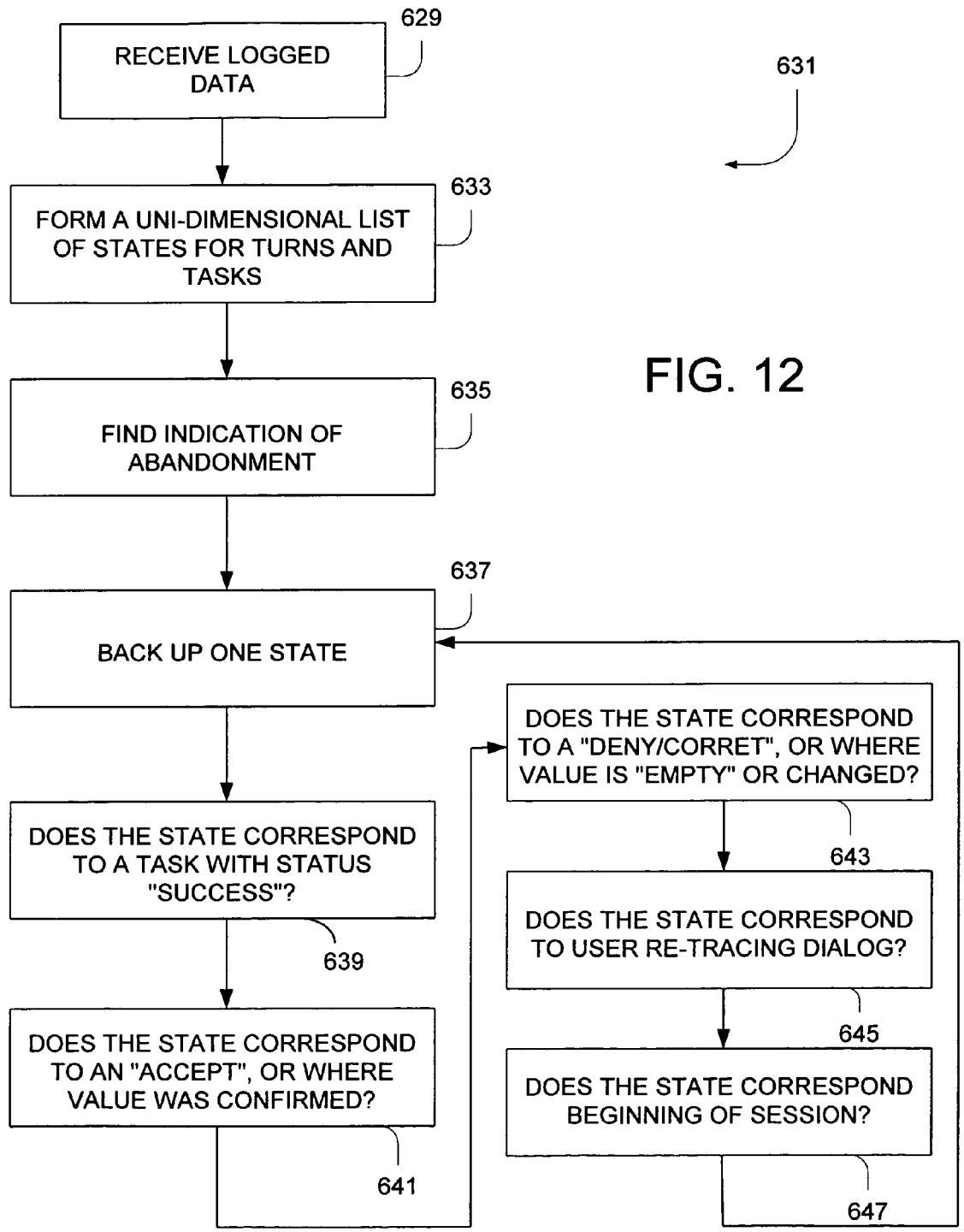
FIG. 12 is a flow chart of a method for performing dialog analysis with respect to identifying the source of dialog problems.

Module 606 and a corresponding process 631 (FIG. 12) are used to find the state which is the likely source of the problem that causes users to abandon a task. A task abandonment is determined relative to the type of recognition. For speech and DTMF any of the following actions can be considered abandonment:

a user hang-up
a user command that cancels the current Task (e.g. "Cancel")
a user command that requests transfer to an agent (e.g. "Operator)
a DTMF key-press that requests transfer to an agent (e.g. 0)

The process or method 631 is applied to sessions where it is known that the user attempted to interact at least once with the automated system (i.e. did not attempt an abandonment action at the start of the call). The process attempts to find the last known correct state from which the problem state can be found. The process is as follows:

For each user session, receive the logged data at step 629 and flatten the task structure, that is: treat dialog turns and/or task entry and/or completion states as a uni-dimensional list of states, ordered in time as indicated at step 633; then:

locate the point of abandonment at step 635; back-track from the abandonment action through the sequence of dialog turns at step 637 until one of the following states is encountered (note the order below may be changed):

(a) if a Task completion with status "Success" is encountered as indicated by step 639, then the immediately subsequent turn state is considered the problem source;

(b) if a user Accepts a value, or any Turn during which a Semantic Item attained a status of "Confirmed" is encountered as indicated by step 641, then the immediately subsequent turn state is considered the problem source (c) if a user Deny/Corrects a value, or any Turn during which a Semantic Item resulted in a status of "Empty" or changed its value is encountered as indicated by step 643, then the closest prior Turn state in which the Semantic Item in question was the topic of a Turn of type "Ask" is considered the problem source (d) if a user "Go Back" or other command that implements a retracing of the user's steps in the session is encountered as indicated by step 645, then take the name of the Turn following the Go Back command (or multiple Go Back commands if in a sequence) and consider the closest instance of that Turn prior to the initial Go Back command the problem source;

(e) if the beginning of the session is reached as indicated by step 647, then assume the first information-requesting Turn state (i.e. the first Ask or Command enabling) in the session is the problem source;

(f) else for all other turn types, keep back-tracking (i.e. return to step 637).

The results can be collated across sessions and presented as a list of states ordered in terms of likelihood of contribution to task abandonment. For example, across data of users in which 76 abandonments occurred 45 were in the "TurnA" state, 15 were in the "TurnB" state, 14 were in the "TurnC" state, and 2 were in the "TurnD" state.

Although the present invention has been described with reference to particular embodiments, workers skilled in the art will recognize that changes may be made in form and detail without departing from the spirit and scope of the invention.

What is claimed is:

1. A computer-implemented method of analyzing dialog between a user and an interactive application having dialog turns, wherein a turn comprises a prompt from the system and a response received from the user, the method comprising:

receiving and storing information in a computer indicative of dialog turns between the system and at least one user in an application, the turns being related to one or more tasks of the application;

utilizing a diagnostic module operable on a computer independent from the user to obtain an indication of performance of the application relative to said one or more tasks wherein the diagnostic module identifies the performance of the application utilizing a confirmation score module, a response turn score module or a user repetition score module; and outputting the indication of performance of the application relative to said one or more tasks based upon analysis of multiple sets of data from the confirmation score module, the response term score module or the user repetition score module, each set of data being from a different user of the system.

2. The computer-implemented method of claim 1 wherein utilizing the confirmation score module to obtain the indication of performance of the application relative to said one or more tasks includes obtaining an indication relating to turns concerning confirmation of a received response relative to turns concerning asking for a response.

3. The computer-implemented method of claim 1 wherein utilizing the response turn score module to obtain the indication of performance of the application relative to said one or more tasks includes obtaining an indication relating to turns concerning asking for a received response relative to task instances in which the asking of the response appears across the information.

4. The computer-implemented method of claim 1 wherein utilizing the diagnostic module to obtain the indication of performance of the application relative to said one or more tasks includes obtaining an indication relating to turns concerning confirming a received response relative to a value being assigned based on the received response.

5. The computer-implemented method of claim 1 wherein utilizing the user repetition score module to obtain the indication of performance of the application relative to said one or more tasks includes obtaining an indication relating a user repeating a turn based on a user request.

6. The computer-implemented method of claim 1 wherein utilizing the diagnostic module to obtain the indication of performance of the application relative to said one or more tasks includes two or more of:

obtaining an indication relating to turns concerning confirmation of a received response relative to turns concerning asking for a response;

obtaining an indication relating to turns concerning asking for a received response relative to task instances in which the asking of the response appears across the information;

obtaining an indication relating to turns concerning confirming a received response relative to a value being assigned based on the received response; and obtaining an indication relating a user repeating a turn based on a user request.

7. A computer-implemented method of analyzing dialog between a user and an interactive application having dialog turns, wherein a turn comprises a prompt from the system and a response received from the user, the method comprising:

receiving and storing information on a computer indicative of dialog turns between the system and at least one user a speech enabled application, the turns being related to one or more tasks of the application;

utilizing a diagnostic module operable on a computer independent from the user to obtain an indication of prompts in the application that are causing confusion; and outputting the indication of prompts in the application that are causing confusion to determine which prompts in the application are causing confusion based upon an analysis by the diagnostic module of the stored information.

8. The computer-implemented method of claim 7 wherein utilizing the diagnostic module to obtain the indication of prompts in the application that are causing confusion includes obtaining an indication of a number of times user silence followed the prompt.

9. The computer-implemented method of claim 7 wherein utilizing the diagnostic module to obtain the indication of prompts in the application that are causing confusion includes obtaining an indication of a number of times a user request for assistance followed the prompt.

10. The computer-implemented method of claim 7 wherein utilizing the diagnostic module to obtain the indication of prompts in the application that are causing confusion includes obtaining an indication of a number of times a user requests the system to repeat the prompt.

11. The computer-implemented method of claim 7 wherein utilizing the diagnostic module to obtain the indication of prompts in the application that are causing confusion includes obtaining an indication of a number of times a recognized response to the prompt was cancelled.

12. The computer-implemented method of claim 7 wherein utilizing the diagnostic module to obtain the indication of prompts in the application that are causing confusion includes obtaining an indication of response latency.

13. The computer-implemented method of claim 7 wherein utilizing the diagnostic module to obtain the indication of prompts in the application that are causing confusion includes two or more of:
- obtaining an indication of a number of times user silence followed the prompt;
- obtaining an indication of a number of times a user request for assistance followed the prompt;
- obtaining an indication of a number of times a user requests the system to repeat the prompt;
- obtaining an indication of a number of times a recognized response to the prompt was cancelled; and
- obtaining an indication of response latency.

14. A computer-implemented method of analyzing dialog between a user and an interactive application having dialog turns, wherein a turn comprises a prompt from the system and a response received from the user, the method comprising:
- receiving and storing information on a computer indicative of dialog turns between the system and at least one user a speech enabled application, the turns being related to one or more tasks of the application;
- utilizing a diagnostic module operable on a computer independent from the user to obtain an indication of a source of a problem in the dialog that causes the user to abandon a task; and
- outputting the indication of a source of a problem in the dialog that causes the user to abandon a task based upon an analysis of the stored information by the diagnostic module.

15. The computer-implemented method of claim 14 wherein utilizing the diagnostic module to obtain the indication of the source of the problem in the dialog that causes the user to abandon the task includes locating a point of abandonment in a sequential list of states indicative of dialog turns and/or task entry and/or task completion.

16. The computer-implemented method of claim 15 wherein a task completion includes a corresponding indication of success, and wherein obtaining the indication of the source of the problem in the dialog that causes the user to abandon the task includes back-tracking from the point of abandonment through the sequential list until a task completion with an indication of success is encountered, wherein the indication of the source of the problem comprises the immediately subsequent turn.

17. The computer-implemented method of claim 15, wherein recognized responses are correlated to the sequential list of states, and wherein obtaining the indication of the source of the problem in the dialog that causes the user to abandon the task includes back-tracking from the point of abandonment through the sequential list until the user accepts a recognized response, or any turn during which a recognized response attains a status of confirmed, wherein the indication of the source of the problem comprises the immediately subsequent turn.

18. The computer-implemented method of claim 15, wherein recognized responses are recorded and correlated to the sequential list of states, and wherein obtaining the indication of the source of the problem in the dialog that causes the user to abandon the task includes back-tracking from the point of abandonment through the sequential list until a turn denies or corrects a recorded recognition response, or a turn during which a location for a recognition response resulted in a status of "Empty", or turn where a recorded recognition response changed its value, wherein the indication of the source of the problem comprises the closest prior turn in which the corresponding recorded recognition response was received in response to an asking turn.

19. The computer-implemented method of claim 15, wherein recognized responses are recorded and correlated to the sequential list of states, and wherein obtaining the indication of the source of the problem in the dialog that causes the user to abandon the task includes back-tracking from the point of abandonment through the sequential list until the user provides a command to retrace the user's steps, then ascertain an indication of a turn following the command, wherein the indication of the source of the problem comprises the closest instance of a turn, corresponding to said indication of the turn, and prior to the command to retrace the user's steps as the source of the problem.

20. The computer-implemented method of claim 15 and wherein obtaining the indication of the source of the problem in the dialog that causes the user to abandon the task includes back-tracking from the point of abandonment through the sequential list until the beginning of a session is reached, wherein a first information-requesting turn is considered the source of the problem.

* * * * *